(12) United States Patent
Kim

(10) Patent No.: US 7,306,090 B2
(45) Date of Patent: Dec. 11, 2007

(54) TABLET PACKAGE CONVEYING APPARATUS FOR TABLET AUTOMATIC PACKING MACHINE

(75) Inventor: Jun-ho Kim, Dalseo-Gu (KR)

(73) Assignee: JVM Co., Ltd., Dalseo-Gu (KR)

( * ) Notice: Subject to any disclaimer, the term of this patent is extended or adjusted under 35 U.S.C. 154(b) by 255 days.

(21) Appl. No.: 11/144,672

(22) Filed: Jun. 6, 2005

(65) Prior Publication Data
US 2006/0118386 A1    Jun. 8, 2006

(30) Foreign Application Priority Data
Dec. 2, 2004    (KR) ...................... 10-2004-0100633

(51) Int. Cl.
*B65G 37/00*    (2006.01)
(52) U.S. Cl. ................ 198/607; 198/459.1; 198/459.8; 198/547
(58) Field of Classification Search ................ 198/607, 198/459.1, 459.8, 813, 814, 547
See application file for complete search history.

(56) References Cited

U.S. PATENT DOCUMENTS

| | | | | |
|---|---|---|---|---|
| 3,805,946 A | * | 4/1974 | Yateman et al. ............ | 198/605 |
| 4,050,575 A | * | 9/1977 | Rossio ........................ | 198/834 |
| 5,899,318 A | * | 5/1999 | Schwer et al. .............. | 198/604 |
| 5,996,769 A | * | 12/1999 | Winchip ................... | 198/626.4 |
| 6,494,311 B2 | * | 12/2002 | Muller ........................ | 198/607 |
| 6,540,101 B1 | * | 4/2003 | Kim ............................. | 221/25 |
| 6,588,183 B1 | * | 7/2003 | Romagnoli ................... | 53/510 |
| 6,772,907 B2 | * | 8/2004 | Kim ............................ | 221/131 |
| 6,898,919 B2 | * | 5/2005 | Kim ............................. | 53/154 |
| 2005/0121295 A1 | * | 6/2005 | Niklewski .................... | 198/603 |

FOREIGN PATENT DOCUMENTS

JP    2006069618 A  *  3/2006

* cited by examiner

*Primary Examiner*—Mark A Deuble
(74) *Attorney, Agent, or Firm*—Oblon, Spivak, McClelland, Maier & Neustadt, P.C.

(57) ABSTRACT

A tablet package conveying apparatus for a tablet automatic packing machine is disclosed. The apparatus can offset a speed difference among conveyed tablet packages while they are conveyed, such that the conveyed tablet packages discharged from the lower side of the tablet automatic packing machine can be more smoothly conveyed to the side wall of the tablet automatic packing machine.

16 Claims, 9 Drawing Sheets

TABLET PACKAGE CONVEYING APPARATUS FOR TABLET AUTOMATIC PACKING MACHINE

BACKGROUND OF THE INVENTION

1. Field of the Invention

The present invention relates to a tablet automatic packing machine, and more particularly to a tablet package conveying apparatus for a tablet automatic packing machine which is capable of offsetting speed differences among conveyed tablet packages while they are conveyed, such that the conveyed tablet packages discharged from the lower side of the tablet automatic packing machine can be more smoothly conveyed to the side wall of the tablet automatic packing machine.

2. Description of the Related Art

A prior art tablet automatic packing machine including a main body 100, as shown in FIG. 9, is configured such that: a plurality of tablet cassettes 200 are arranged on a shelf of the main body 100, in which the shelf is located a predetermined height from the bottom of the main body; a hopper 300 is installed under the tablet cassettes 200, a pair of pouch rollers 400 are installed at and under both sides of the hopper 300; a pair of drive rollers 500 are installed under the hopper 300; and a sealing unit 600 is installed between the hopper 300 and the pair of drive rollers 500 to heat and seal pouches.

Such prior art tablet automatic packing machine is operated such that: when tablets are discharged from tablet cassettes 200 to the hopper 300, the tablets in the hopper 300 are contained between pouch papers, which are drawn from the pair of the pouch rollers 400 as the pair of drive rollers 500 are operated; and when the pouch papers containing the tablets are heated to be sealed by the sealing unit 600, while they are downwardly conveyed, thereby achieving tablet packages P that are downwardly discharged from the main body 100.

However, even though the prior art tablet automatic packing machine successively and automatically seals the pouch papers to contain tablets and conveys the tablet packages thereunder, the tablet packages are frequently entangled at the bottom.

Also, since the tablet packages are tangled at the bottom, the tablet automatic packing machine must be installed relatively high, which causes a problem that its installation space is restricted.

SUMMARY OF THE INVENTION

Therefore, the present invention has been made in view of the above problems, and it is an object of the present invention to provide a tablet package conveying apparatus for a tablet automatic packing machine whose structure is changed to compensate for the speed difference among conveyed tablet packages while they are conveyed, such that the conveyed tablet packages discharged from the lower side of the tablet automatic packing machine can be more smoothly conveyed to the side wall of the tablet automatic packing machine.

It is another object of the present invention to provide a tablet package conveying apparatus for a tablet automatic packing machine which is capable of tightly maintaining tablet packages and smoothly conveying the tablet packages on a conveyor belt to the upper direction thereof, in which tension of the conveyor belt can be easily adjusted.

In accordance with an aspect of the present invention, the above and other objects can be accomplished by the provision of a tablet package conveying apparatus for a tablet automatic packing machine comprising: a body for guiding tablet packages, downwardly discharged from the tablet automatic packing machine, to sides thereof, in which the body has a curved part curved from the lower side thereof to the upper side thereof; a conveying unit for conveying the tablet packages to the upper side thereof along the body, in which the conveying unit includes a conveyor belt inside the body; a driving unit for driving the conveying unit such that the conveyor belt is rotated; and a speed difference removing unit for removing difference between conveying speeds of tablet packages, as the conveyor belt is instantaneously loosened, in which the conveying speeds of tablet packages are speeds at both end parts of the conveyor belt, with respect to the curved part of the body.

Preferably, the body may include: a pair of first side plates and a pair of second side plates, which are spaced apart from one another by a plurality of supporting bars to be located at the inside of the conveyor belt, respectively; and a pair of curved connection plates installed between a first end of the pair of first side plates and a first end of the pair of second side plates, such that the pair of second side plates are upwardly installed with respect to the pair of first side plates forming a predetermined angle therebetween.

Preferably, the conveying unit may include: a feeding roller rotatably installed at the second end of the pair of the first side plates, the feeding roller winding one end of the conveyor belt therearound; a guide roller rotatably installed to the curved connection plates, contacting the outer surface of the conveyor belt; a return roller rotatably installed to the curved connection plates, contacting the inner surface of the conveyor belt; and an idle roller installed at the second end of the pair of second side plates and between the pair of second side plates, the idle roller winding the other end of the conveyor belt therearound.

Preferably, the driving unit may include: a driving motor installed at the second end of the first side plates; a driving gear installed at a spindle of the driving motor; and a rotation gear installed at a shaft of the feeding roller, gearing with the driving gear.

Preferably, the speed difference removing unit includes: a rotation shaft to which the guide roller is rotatably installed, sliding holes formed around the rotation shaft of the curved connection plates such that the rotation shaft is slid up and down; and elastic supporting units elastically supporting the rotation shaft.

Preferably, the elastic supporting unit may include: supporting pins each end of which is connected to each end of the rotation shaft of the guide roller; a supporting member mounted on the outer side of the curved connection plate such that the supporting pins can be slidably inserted thereto; a spring protruded to the lower end of the supporting member, in which the spring received the supporting pins therein; and a fixing step formed at the lower end of the supporting pin such that the end of the spring can be fixed thereto.

Preferably, the guide roller may form a groove on an outer circumference thereof, such that raising intervals of the guide rollers are reduced and the tablet packages are smoothly entered into the outer circumference thereof.

Preferably, the pair of the first side plates have installed a first supporting plate therebetween, and the pair of the second side plates have installed a second supporting plate therebetween, in which the first and second supporting plates contact and support the lower surface of the conveyor belt.

Preferably, the body may include: an entrance roller installed inside the first side plates and at a second end of the first supporting plates such that the entrance roller can contact the outer surface of the conveyor belt; and a roller supporting unit for supporting the entrance roller which is rotated with respect to its one end shaft, in which the roller supporting unit is elastically rotated with respect to its other end shaft.

Preferably, the roller supporting unit may include: an angle adjusting member, one end of which is rotatably connected to each entrance roller and one end of which is rotatably connected to each of the first side plates; a pair of supporting steps which are formed at the outer surface of the angle adjusting member and the outer surface of each of the first side plates, respectively; and a twist spring which is installed to the lower end of the angle adjusting member and, at the same time, installed to the upper and lower ends of the supporting step, such that the twist spring can elastically support the angle adjusting member.

Preferably, the guide roller forms a groove on the outer circumference thereof, such that the tablet packages are smoothly entered on the outer circumference, in which the groove is formed such that diameter of the guide roller is decreased from both sides to the center.

Preferably, the body may include: a guide guiding the tablet packages downwardly discharged therefrom to the front of the entrance roller, in which the guide is formed in the shape of an arc inside the first side plates, and faces the entrance roller.

Preferably, the apparatus may further include an elastically pressing unit for elastically pressing the tablet packages conveyed on and along the conveyor belt, with respect to the first and second supporting plates.

Preferably, the elastically pressing unit may include: first and second pressing plates, which are installed within the pair of first side plates and the pair of second side plates, and spaced apart from the upper surface of the conveyor belt; a plurality of locking steps which are formed at both sides of the first and second pressing plates, and hung on the upper sides of the first and second side plates; penetrating pins which penetrate the side plates to be installed at the locking steps; and supporting springs, each of which is elastically located between the lower end of each penetrating pin and the lower surface of each of the plates, in which each penetrating pin is passed through each supporting spring.

Preferably, the first and second pressing plates form a plurality of lengthened holes parallel to the direction of conveying the tablet packages, such that friction between the pressing plates and the tablet packages can be reduced.

Preferably, the second pressing plate forms a curved part at the end thereof, in which curvature of the curved part is the same as that of the idle roller.

Preferably, the idler roller may include: a tension adjusting unit for adjusting tension of the conveyor belt.

Preferably, the tension adjusting unit may include: an idle shaft to which the idle roller is rotatably installed; sloped holes which are formed at the second side plates, in which the idle shaft is installed within the sloped holes; control members installed to the second side plates at the lower end sides of the sloped holes; and adjusting bolts spirally connected to the control members and contacted by the outer surfaces of the idle shafts.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

With reference to the attached drawings, a detailed description of the embodiment of the present invention is given below.

Figure 1:
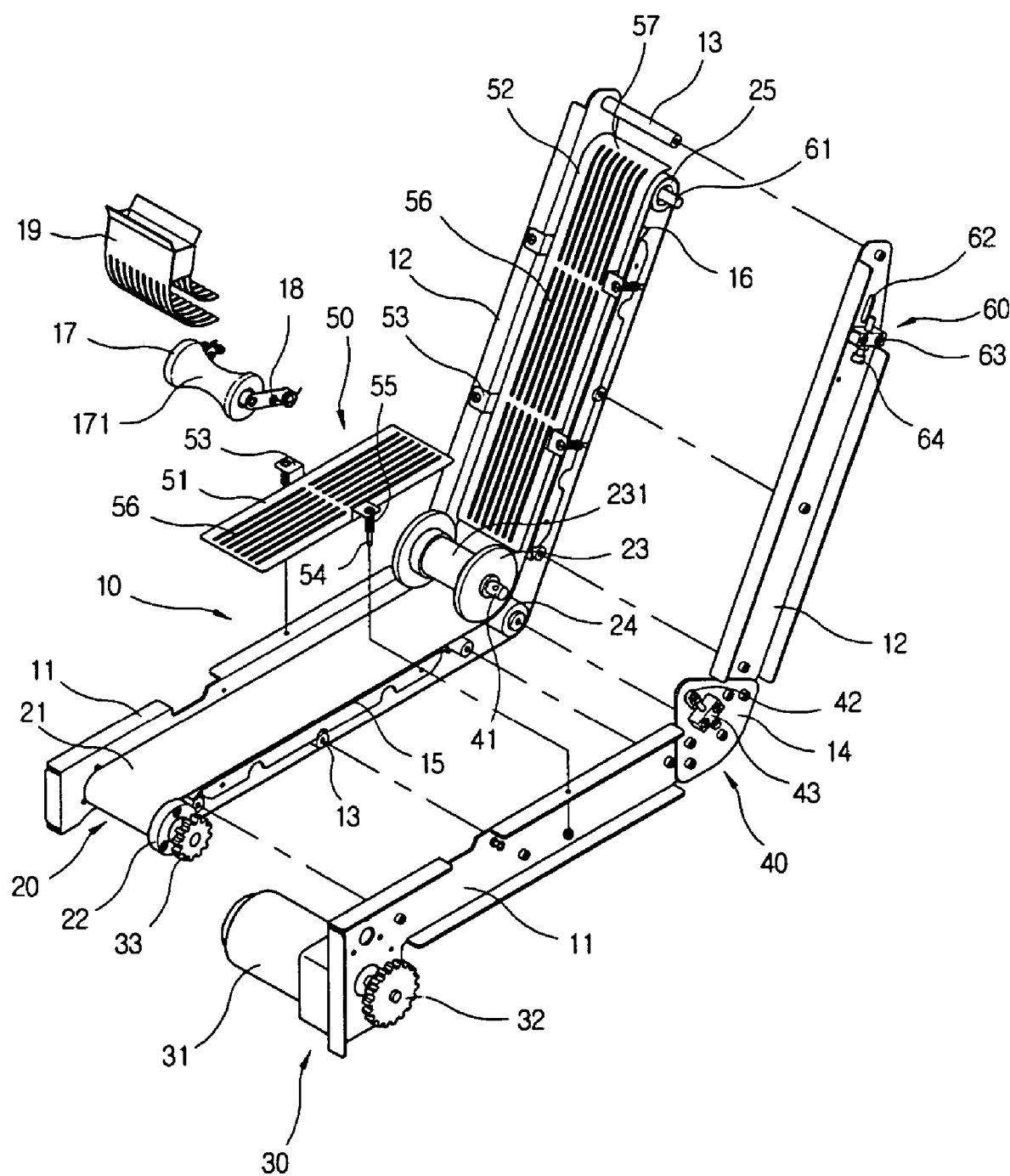
FIG. 1 is a partially exploded perspective view of a tablet package conveying apparatus for a tablet automatic packing machine according to the present invention.
Figure 2:
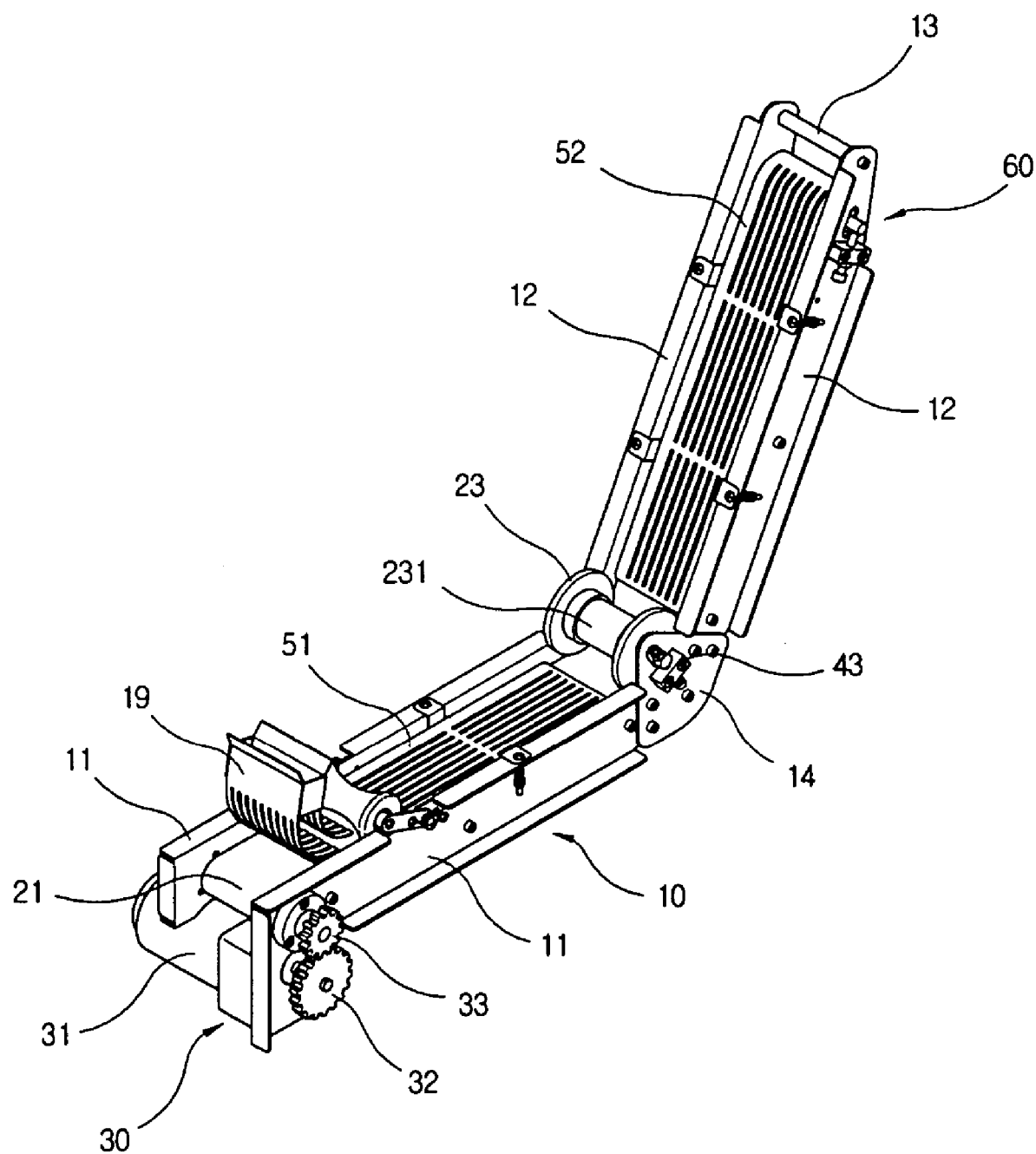
FIG. 2 is a perspective view of a tablet package conveying apparatus in a state where the elements of FIG. 1 are assembled.

FIG. 1 is a partially exploded perspective view of a tablet package conveying apparatus for a tablet automatic packing machine according to the present invention, and FIG. 2 is a perspective view of a tablet package conveying apparatus in a state where the elements of FIG. 1 are assembled.

As shown in the drawings, the tablet package conveying apparatus includes a body 10, a conveying unit 20 having a conveyor belt 21 inside the body 10, a driving unit 30 installed at one side of the body to drive the conveying unit 20, and a speed difference removing unit 40 installed at a curved part of the body 10.

The body 10 includes a pair of first side plates 11 and a pair of second side plates 12, which are spaced apart from one and another by a plurality of supporting bars 12 to be located at the inside of the conveyor belt 21, respectively. Also, the body 10 includes a pair of curved connection plates 14 installed between a first end of the pair of first side plates 11 and a first end of the pair of second side plates 12, such that the pair of second side plates are upwardly installed with respect to the pair of first side plates forming a predetermined angle therebetween. Namely, the pair of second side plates 12 is erected at a predetermined angle, with respect to the pair of first side plates 11.

Such a body 10 includes curved parts which are curved from their lower sides to upper sides to guide tablet packages downwardly discharged from the tablet automatic packing machine to one side thereof, in which the bent parts are formed by the pair of curved connection plates 14. The body 10 supports the conveying unit 20 and the driving unit 30, and functions as a guide path such that the discharged tablet packages can be guided to the sidewall thereof.

The body 10 is configured such that, first and second supporting plates 15 and 16 are installed inside the first side plates 11 and the second side plates 12, respectively, and thus contact the inner surface of the conveyor belt 21. Also, the body 10 includes an entrance roller 17 installed inside the first side plates 11 and at a second end of the first supporting plates 15 such that the entrance roller 17 can contact the outer surface of the conveyor belt 21. In addition, the body 10 includes a roller supporting unit 18 for supporting the entrance roller 17 which is rotated with respect to one shaft located at one end of the roller supporting unit 18, in which the roller supporting unit 18 is elastically rotated with respect to other shaft located at other end thereof. Further, the body 10 includes a guide 19 guiding the tablet packages downwardly discharged therefrom to the front of the entrance roller, in which the guide is formed in the shape of an arc inside the first side plates and faces the entrance roller 17.

Here, the first and second supporting plates 15 and 16 support the inner surface of the conveyor belt 21 and prevent the conveyor belt 21 from sagging.

The entrance roller 17 performs a radial and elastic movement with respect to the other end axis of the roller supporting unit 18, and thus presses the tablet packages entered in the conveyor belt through the guide 19, such that the tablet packages closely pressed to the conveyor belt can be smoothly conveyed. On the other hand, the entrance roller 17 is curved (curved portion 171) from both ends to its center, such that the tablet packages can be smoothly passed therethrough.

The conveying unit 20 includes a feeding roller 22 rotatably installed at the second end of the pair of the first side plates 11 and between the pair of the first side plates 11, around which one end of the conveyor belt 21 is wound. Also, the conveying unit 20 includes a guide roller 23 rotatably installed to the curved connection plates 14, contacting the outer surface of the conveyor belt 21, and a return roller 24 rotatably installed to the curved connection plates 14, contacting the inner surface of the conveyor belt 21. In addition, the conveyor unit 20 includes an idle roller 25 installed at the second end of the pair of second side plates 12 and between the pair of second side plates 12, around which the other end of the conveyor belt 21 is wound.

Such a conveying unit 20 is operated such that the conveyor belt 21 loads the tablet packages downwardly discharged from the tablet automatic packing machine thereon, and conveys the tablet packages to the upper direction along the body 10 as the driving unit 30 operates, in which the conveyor belt 21 is wound at the second end of the feeding roller 22 and the second end of the idle roller 25 and curved by the guide roller 23 and the return roller 24 at the curved connection plates 14. Here, since the guide roller 23 forms a groove 231 on the outer circumference thereof, in which the groove is formed such that the diameter of the guide roller is decreased from both sides to the center, rising intervals of the guide roller 23 are decreased by the tablet packages such that the tablet packages are smoothly entered on the outer circumference.

The driving unit 30 includes a driving motor 31 installed at the second end of the first side plates 11, a driving gear 32 installed at a spindle of the driving motor 31, and a rotation gear 33 installed at a shaft of the feeding roller 22, geared with the driving gear 32.

The driving unit 30 is operated such that: the driving gear 32 is rotated as the driving motor 31 is driven, and thus the rotation gear 33 geared in the driving gear 32 is rotated to rotate the feeding roller 22. Therefore the conveyor belt 21 wound around the feeding roller 22 is rotated.

Also, the speed difference removing unit 40 includes a rotation shaft 41 to which the guide roller 23 is rotatably installed, sliding holes 42 formed around the rotation shaft 41 of the curved connection plates 14 such that the rotation shaft 41 is slopely slid up and down, and elastic supporting units 43 elastically supporting the rotation shaft 41.

The speed difference offsetting unit 40 is operated such that: when the entering tablet packages contact the outer surface of the guide roller 23, the rotation shaft 41 of the guide roller 23 is slopely raised along the sliding holes 42 in a state where it is elastically supported by the elastic supporting units 43. Therefore, the conveyor belt 21 in contact with the guide roller 23 is instantly loosened.

Therefore, the speed difference removing unit 40 instantaneously loosens the conveyor belt 21, such that the feeding roller 22 rotated by the driving unit 30 can be slipped. Then, transmission of driving force for the conveyor belt 21 is instantly stopped, and thus conveying the speed difference of the tablet packages between both ends of the body 10 with respect to the curved part of the body 10 can be removed.

The conveying apparatus further includes an elastically pressing unit 50 for elastically pressing the tablet packages conveyed on and along the conveyor belt 21, and a tension adjusting unit 60 which is installed to the idle roller 25 such that tension of the conveyor belt 21 can be adjusted.

The elastically pressing unit includes first and second pressing plates 51 and 52, which are installed within the pair of first side plates 11 and the pair of second side plates 12, and spaced apart from the upper surface of the conveyor belt 21, a plurality of locking steps 53 which are formed at both sides of the first and second pressing plates 51 and 52, and hung on the upper sides of the first and second side plates 11 and 12, penetrating pins 54 which penetrate the side plates 11 and 12 to be installed at the locking steps 53, and supporting springs 55 each of which is stretched between the lower end of the penetrating pins 54 and the lower surface of each of the plates 11 and 12, in which each penetrating pin 54 is passed through each supporting spring 55.

Here, the elastically pressing unit 50 is operated such that: the tablet packages loaded on the conveyor belt 21 are conveyed by the conveyor belt 21, as the first and second pressing plates 51 and 52 are raised to press the tablet packages, which is caused by the supporting springs 55, such that the tablet packages are properly closed to the conveyor belt 21. Therefore, the tablet packages are smoothly conveyed to the upper direction by the conveyor belt 21.

The first and second pressing plates 51 and 52 form a plurality of lengthened holes parallel to the direction in which the tablet packages are conveyed, such that friction between the pressing plates 51 and 52 and the tablet packages can be reduced and thus the tablet packages are smoothly conveyed in a pressed state.

In addition, the second pressing plate 52 forms a curved part 57 at the end thereof, in which curvature of the curved part 57 is the same at that of the idle roller 25, such that the tablet packages are smoothly conveyed by the curved part to the end thereof in a state where the tablet packages are pressed.

The tension adjusting unit 60 includes an idle shaft 61 to which the idle roller 25 is rotatably installed, and sloped holes 62 which are formed at the second side plates 12, in which the idle shaft 61 is installed within the sloped holes 62. Also, the tension adjusting unit 61 includes control members 63 installed to the second side plates 12 at the lower end sides of the sloped holes 62, and adjusting bolts 64 spirally connected to the control members 63 and contacted by the outer surfaces of the idle shafts 61.

Such tension adjusting units 60 are operated such that: as the adjusting bolts 64 are rotated with respect to the control members 63 to slide the idle shafts 61 along the sloped holes 62 upper and lower directions, the position of the idle roller 25 is changed and thus the tension of the conveyor belt 21 wound around the idle roller 25 is adjusted.

Figure 3:
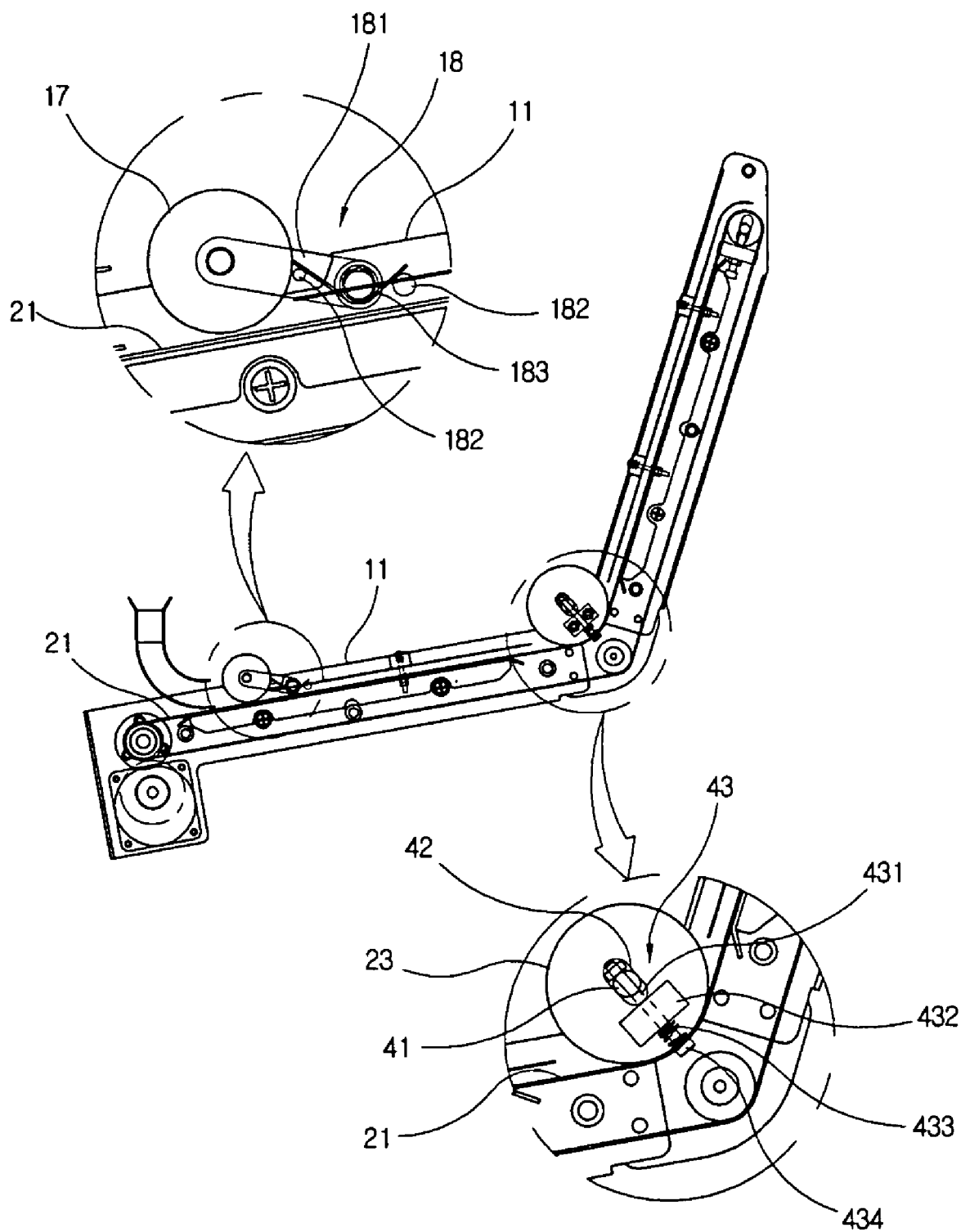
FIG. 3 is a cross-sectional view of a tablet package conveying apparatus, illustrating primary enlarged views.

FIG. 3 is a cross-sectional view of a tablet package conveying apparatus, illustrating primary enlarged views.

As shown in FIG. 3, the roller supporting unit 18 includes an angle adjusting member 181 one end of which is rotatably connected to each entrance roller 17 and the other end of which is rotatably connected to each of the first side plates 11, a pair of supporting steps 182 which are formed at the outer surface of the angle adjusting member 181 and the outer surface of each of the first side plates 11, respectively, and a twist spring 183 which are installed to the lower end of the angle adjusting member 181 and, at the same time, installed to the upper and lower ends of the supporting step 182, such that the twist spring 183 can elastically support the angle adjusting member 181.

The roller supporting unit 18 is operated such that: when the tablet packages enter the entrance roller 17, the entrance roller 17 is raised, and thus the angle adjusting member 18 performs elastic and radial rotation with respect to the lower end thereof in a state where the angle adjusting member 18 is tensioned by the twist spring 183. Therefore, the entrance roller 17 presses the tablet packages with a predetermined pressure an externally applied force such that the convey belt 21 smoothly conveys the tablets packages.

The elastic supporting unit 43 includes supporting pins 431 each end of which is connected to each end of the rotation shaft 41 of the guide roller 23, a supporting member 432 mounted on the outer side of the curved connection plate 14 such that the supporting pins 431 can be slidably inserted thereto, a spring 433 protruded to the lower end of the supporting member 432, in which the spring 433 receives the supporting pins 431 therein, and a fixing step 434 formed at the lower end of the supporting pin 431 such that the end of the spring 433 can be fixed thereto.

The elastic supporting unit 43 is operated such that: when the rotation shaft 41 of the guide roller 43 is raised according to the sliding hole 42, the rotation shaft 41 is elastically supported by the spring 433 and is smoothly restored. Therefore, the conveyer belt 21 is instantaneously loosened to remove conveying speed difference.

Figure 4:
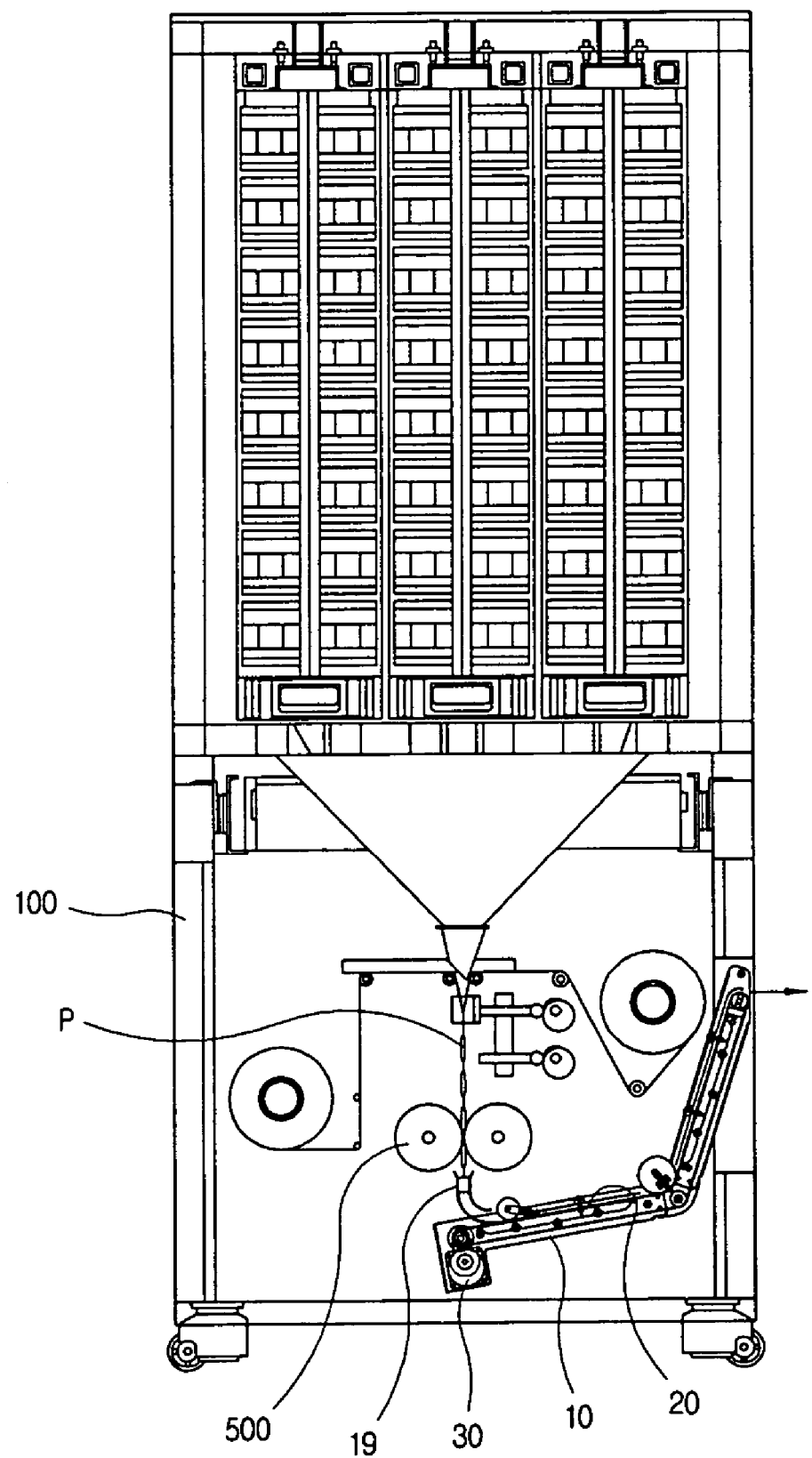
FIG. 4 is a cross-sectional view of a tablet package conveying apparatus in a state where it is installed to a tablet automatic packing machine.

FIG. 4 is a cross-sectional view of a tablet package conveying apparatus in a state where it is installed to a tablet automatic packing machine.

As shown in FIG. 4, the conveying apparatus is installed in the main body 100 of the tablet automatic packing machine and guides tablet packages P downwardly discharged from the driving roller 500 through the guide 19 to input the tablet packages P in a body 10.

After that, the tablet packages P conveyed to the body 10 are discharged to the side of the tablet automatic packing machine by the conveying unit 20, along the body 10. Here, the driving unit 30 drives the conveying unit 20.

FIGS. 5 to 8 are primary enlarged cross-sectional views illustrating operation states of a tablet package conveying apparatus according to the present invention.

Figure 5:
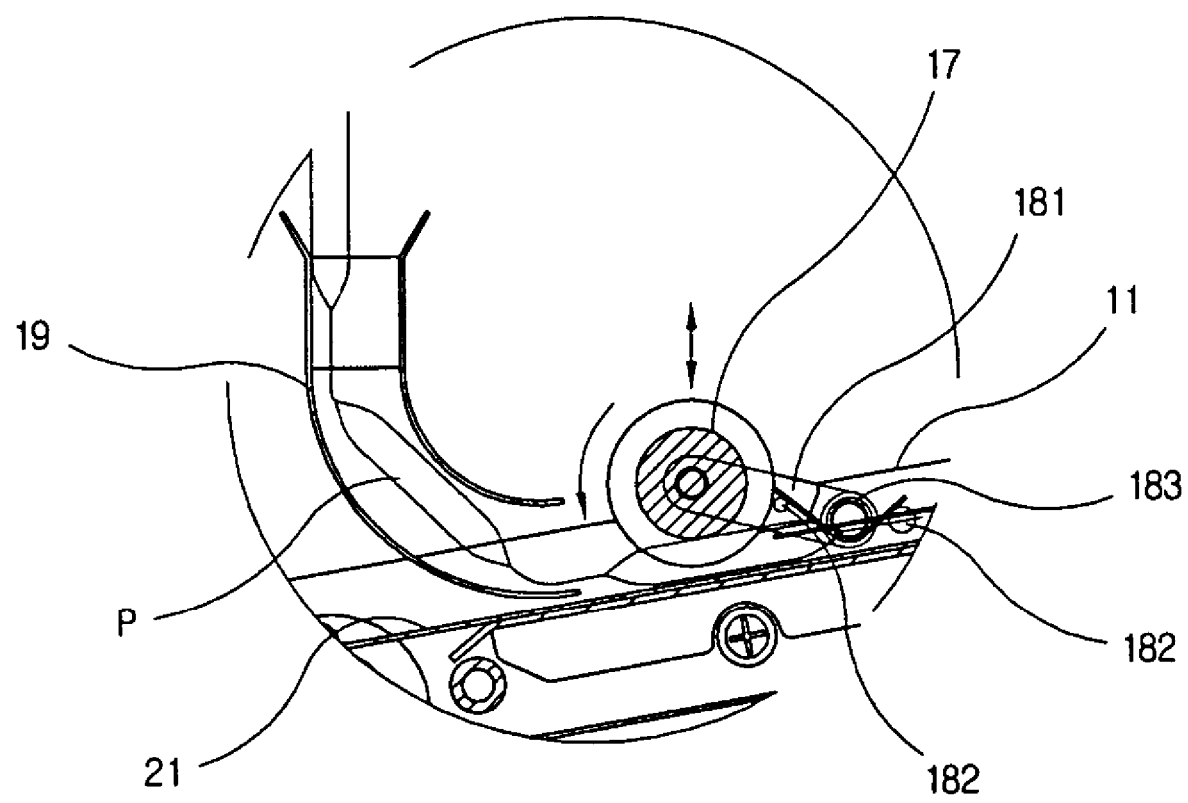
FIGS. 5 to 8 are primary enlarged cross-sectional views illustrating operational states of a tablet package conveying apparatus according to the present invention.

As shown in FIG. 5, the tablet packages P downwardly discharged from the tablet automatic packing machine are guided on the upper surface of the conveyor belt 21 through the guide 19 and conveyed thereto as the conveyor belt 21 is rotationally moved.

Here, when the tablet packages are entered into the entrance roller 17 included in the first side plates 11 through the rear part of the guide 19, the entrance roller 17 is raised due to the thickness of the tablet packages P. Then, the angle adjusting member 181 is rotated, such that the twist springs 183 are twisted by the supporting steps 182. As the twist springs 183 are pressed, the entrance roller 17 slightly presses tablet packages P. Therefore, the tablet packages P are closely pressed against the surface of the conveyor belts 21 and smoothly entered to be stably conveyed along the conveyor belt 21.

Figure 6:
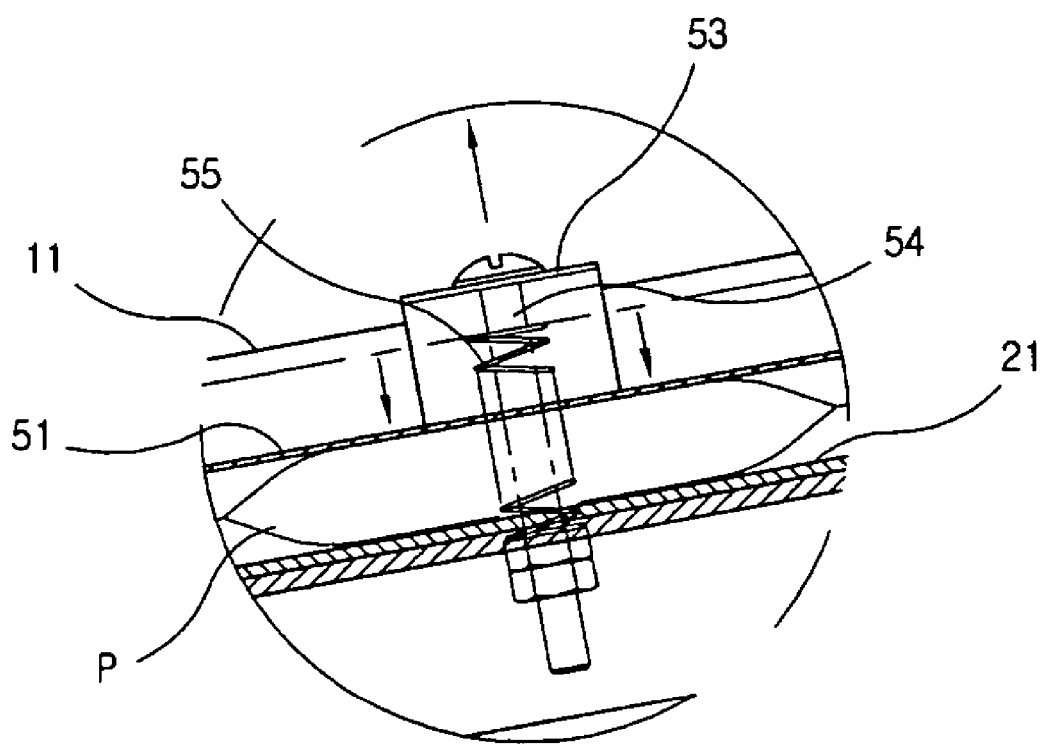

As shown in FIG. 6, while the tablet packages P loaded on the conveyor belt 21 are conveyed as the conveyer belt 21 is moved and passed through the first pressing plates 51, the pressing plates 51 are raised by the thickness of the tablet packages P.

At the same time, locking steps 53 formed in the first pressing plates 51 are raised to raise the penetrating pins 54. Therefore, the supporting springs 55 included in the penetrating pins 54 are contacted to the lower surface of the first side plates 11 and pressed, accordingly.

As the supporting springs 55 are pressed, the first pressing plates 51 slightly press the tablet packages P loaded on the conveyor belt 21. Therefore, the tablet packages P are slopely raised to be moved to the upper direction thereof in a state where the tablet packages are closely contacted thereon.

Figure 7:
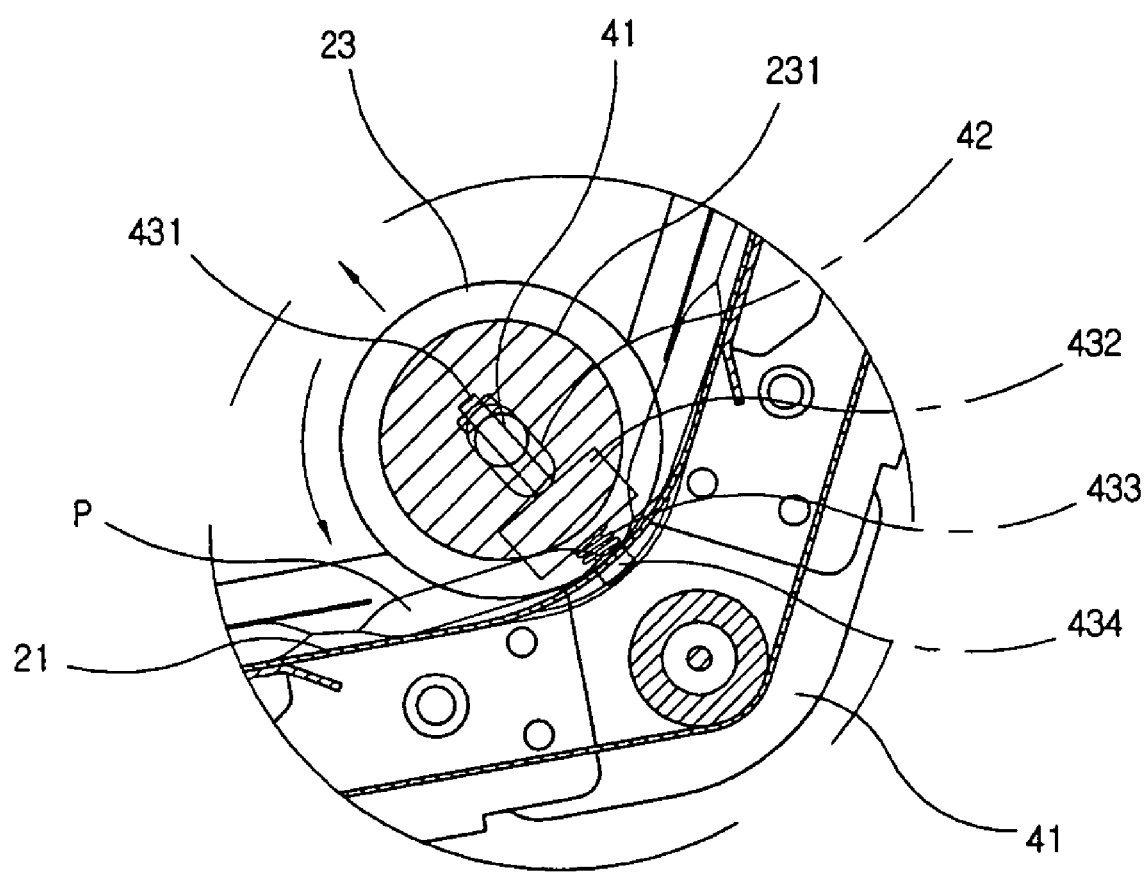

As shown in FIG. 7, while the tablet packages P conveyed along the conveyor belt 21 are passed through the guide roller 23, they are pressed against the groove 231 formed on the outer surface of the guide roller 23 based on the thickness of the tablet packages such that the guide roller 23 is slopely raised.

Here, the rotation shaft 41 of the guide roller 23 is raised along the sliding holes 42 to raise the supporting plate 431. A spring 433 is pressedly inserted by the supporting pin 431 between the fixing step 434 formed at the lower end of the supporting pins 431 and the supporting member 432 penetrated by the supporting pin 431.

As the rotation shaft 41 of the guide roller 23 is slopely raised along the sliding hole 42 in a state where the spring 433 is pressed, and thus the guide roller 23 is raised, the conveyor belt 21 contacting the outer surface of the guide roller 23 is raised and instantaneously loosened.

As the conveyor belt 21 is instantaneously loosened, a driving force is not instantaneously stopped transmitting thereto, such that difference between conveying speeds of the tablet packages P can be instantaneously offset, in which the conveying speeds are speeds at both sides of the tablet packages with respect to the curved connection plate 14.

As such, the conveying speed difference is instantaneously and repeatedly removed, the tablet packages P are not congested at the guide roller 23, but smoothly and upwardly conveyed at a constant speed along the conveyor belt 21.

Figure 8:
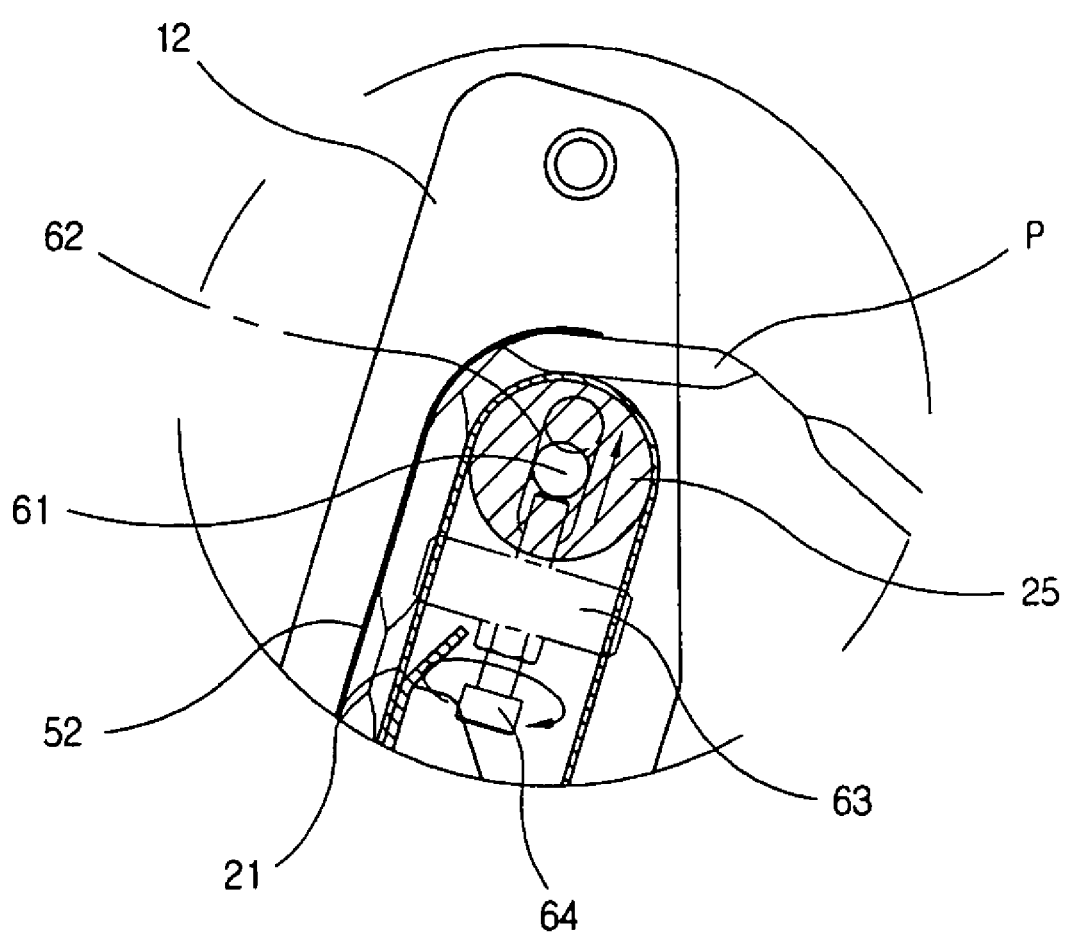
Figure 9:
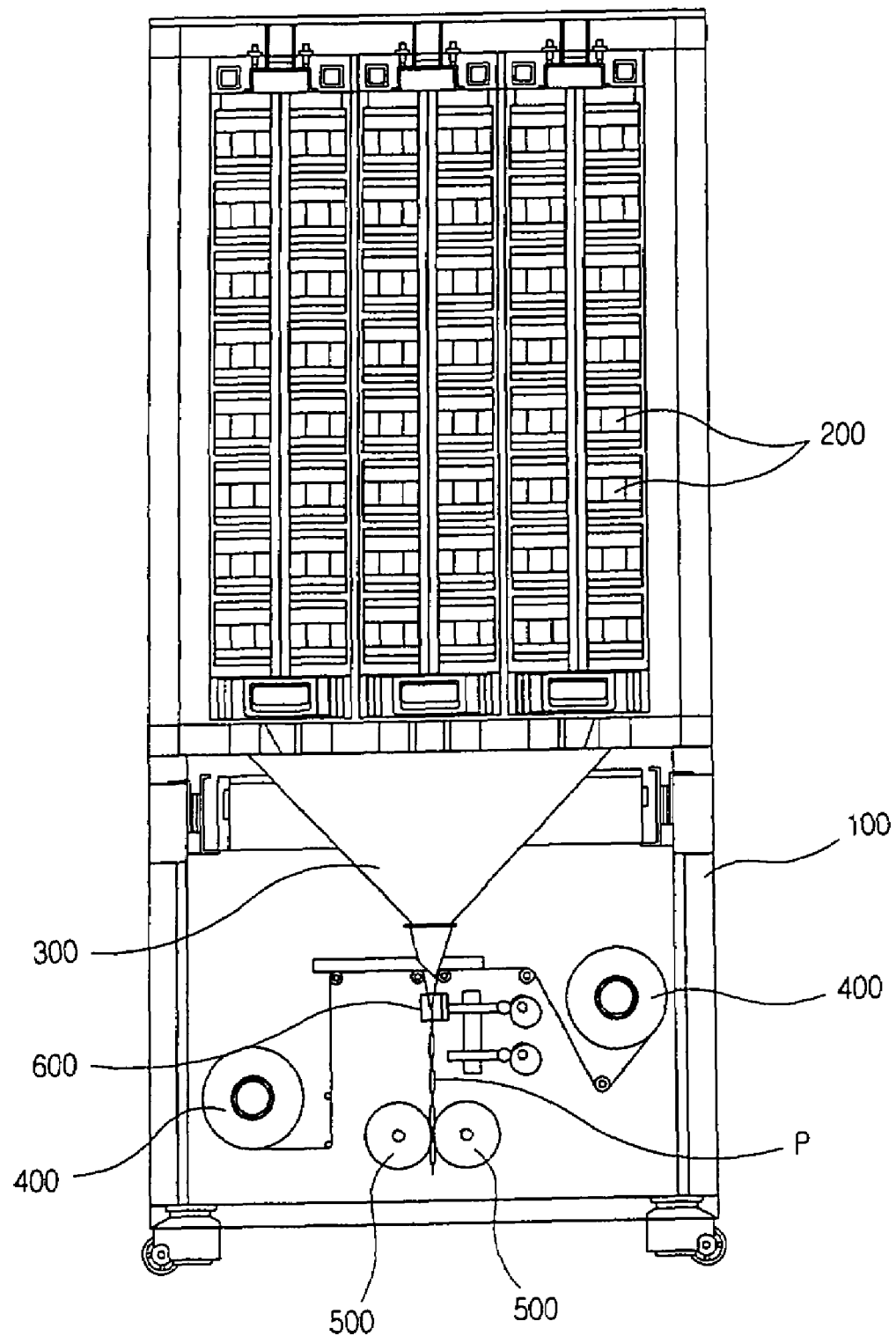
FIG. 9 is a cross-sectional view illustrating a prior art tablet automatic packing machine.

As shown in FIG. 8, the tablet packages P are upwardly conveyed along the conveyor belt 21 in a state where they are slightly pressed by the second pressing plates 52 to be closely contacted to the upper surface of conveyor belt 21.

After that, the tablet packages P are raised to the idle roller 25 around which the conveyor belt 21 is wound and then discharged to the side of the second side plate 12.

In addition, when the adjusting bolts 64 spirally connected to the adjusting member 63 are rotated such that the idle shaft 61 of the idle roller 25 is upwardly slid along the sloped holes 62, tension of the conveyor belt 21 wound around the idle roller 25 is controlled.

As mentioned above, the tablet package conveying apparatus according to the present invention smoothly conveys the tablet packages, which are downwardly discharged from the main body, to the side of the main body, thereby enhancing convenience of use and removing inconvenience generated when the tablet packages are downwardly discharged.

Also, the tablet package conveying apparatus according to the present invention removes differences of conveying speeds of tablet packages such that the tablet packages, downwardly discharged form the tablet automatic packing machine, can be more smoothly conveyed to the side thereof. Therefore, the tablet packages are upwardly conveyed at a constant speed and then are smoothly discharged to the side of the main body, preventing the tablet packages from congesting.

Further, the tablet package conveying apparatus according to the present invention easily adjusts the tension of the conveyor belt, thereby enhancing accuracy and stability for its operations and stably conveying the tablet packages.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tablet package conveying apparatus for a tablet automatic packing machine comprising:
   a body for guiding tablet packages, downwardly discharged from the tablet automatic packing machine, to sides thereof, in which the body has a curved part curved from the lower side thereof to the upper side thereof;
   a conveying unit for conveying the tablet packages to the upper side thereof along the body, in which the conveying unit includes a conveyor belt inside the body;
   a driving unit for driving the conveying unit such that the conveyor belt is rotated; and
   a speed difference removing unit for offsetting a difference between conveying speeds of tablet packages, as the conveyor belt is instantaneously loosened, in which the conveying speeds of tablet packages are speeds at both end parts of the conveyor belt, with respect to the curved part of the body;
   a pair of first side plates and a pair of second side plates, which are spaced apart from one another by a plurality of supporting bars to be located at the inside of the conveyor belt, respectively; and
   a pair of curved connection plates installed between a first end of the pair of first side plates and a first end of the pair of second side plates, such that the pair of second side plates are upwardly installed with respect to the pair of first side plates forming a predetermined angle therebetween, wherein the conveying unit includes:
   a feeding roller rotatably installed at the second end of the pair of the first side plates, the feeding roller winding one end of the conveyor belt therearound;
   a guide roller rotatably installed to the curved connection plates, contacting the outer surface of the conveyor belt;
   a return roller rotatably installed to the curved connection plates, contacting the inner surface of the conveyor belt; and
   an idle roller installed at the second end of the pair of second side plates and between the pair of second side plates, the idle roller winding the other end of the conveyor belt therearound.

2. The apparatus as set forth in claim 1, wherein the driving unit includes:
   a driving motor installed at the second end of the first side plates;
   a driving gear installed at a spindle of the driving motor; and
   a rotation gear installed at a shaft of the feeding roller, gearing with the driving gear.

3. The apparatus as set forth in claim 2, wherein the speed difference removing unit includes:
   a rotation shaft to which the guide roller is rotatably installed, sliding holes formed around the rotation shaft of the curved connection plates such that the rotation shaft is slid up and down; and
   elastic supporting units elastically supporting the rotation shaft.

4. The apparatus as set forth in claim 3, wherein the elastic supporting unit includes:
   supporting pins each end of which is connected to each end of the rotation shaft of the guide roller;
   a supporting member mounted on the outer side of the curved connection plate such that the supporting pins can be slidably inserted thereto;
   a spring protruded to the lower end of the supporting member, in which the spring received the supporting pins therein; and
   a fixing step formed at the lower end of the supporting pin such that the end of the spring can be fixed thereto.

5. The apparatus as set forth in claim 3 or 4, wherein the guide roller forms a groove on an outer circumference thereof, such that raising intervals of the guide rollers are reduced and the tablet packages are smoothly entered into the outer circumference thereof.

6. The apparatus as set forth in claim 1, wherein the pair of the first side plates install a first supporting plate therebetween, and the pair of the second side plates install a second supporting plate therebetween, in which the first and second supporting plates contact and support the lower surface of the conveyor belt.

7. The apparatus as set forth in claim 6, wherein the body includes:
   an entrance roller installed inside the first side plates and at a second end of the first supporting plates such that the entrance roller can contact the outer surface of the conveyor belt; and
   a roller supporting unit for supporting the entrance roller which is rotated with respect to its one end shaft, in which the roller supporting unit is elastically rotated with respect to its other end shaft.

8. The apparatus as set forth in claim 7, wherein the roller supporting unit includes:
   an angle adjusting member, one end of which is rotatably connected to each entrance roller and one end of which is rotatably connected to each of the first side plates;
   a pair of supporting steps which are formed at the outer surface of the angle adjusting member and the outer surface of each of the first side plates, respectively; and
   a twist spring which is installed to the lower end of the angle adjusting member and, at the same time, installed to the upper and lower ends of the supporting step, such that the twist spring can elastically support the angle adjusting member.

9. The apparatus as set forth in claim 7 or 8, wherein the guide roller forms a groove on the outer circumference thereof, such that the tablet packages are smoothly entered on the outer circumference, in which the groove is formed such that diameter of the guide roller is decreased from both sides to the center.

10. The apparatus as set forth in claim 7 or 8, wherein the body includes:

a guide guiding the tablet packages downwardly discharged therefrom to the front of the entrance roller, in which the guide is formed in the shape of an arc inside the first side plates, and faces the entrance roller.

11. The apparatus as set forth in claim 6, further comprising:

an elastically pressing unit for elastically pressing the tablet packages conveyed on and along the conveyor belt, with respect to the first and second supporting plates.

12. The apparatus as set forth in claim 11, wherein the elastically pressing unit includes:

first and second pressing plates, which are installed within the pair of first side plates and the pair of second side plates, and spaced apart from the upper surface of the conveyor belt;

a plurality of locking steps which are formed at both sides of the first and second pressing plates, and hung on the upper sides of the first and second side plates;

penetrating pins which penetrate the side plates to be installed at the locking steps; and supporting springs, each of which is elastically located between the lower end of each penetrating pin and the lower surface of each of the plates, in which each penetrating pin is passed through each supporting spring.

13. The apparatus as set forth in claim 12, wherein the first and second pressing plates form a plurality of lengthened holes parallel to the direction of conveying the tablet packages, such that friction between the pressing plates and the tablet packages can be reduced.

14. The apparatus as set forth in claim 12, wherein the second pressing plate forms a curved part at the end thereof, in which curvature of the curved part is the same as that of the idle roller.

15. The apparatus as set forth in any one of claims 1 to 4, wherein the idler roller includes:

a tension adjusting unit for adjusting tension of the conveyor belt.

16. The apparatus as set forth in claim 15, wherein the tension adjusting unit includes:

an idle shaft to which the idle roller is rotatably installed;

sloped holes which are formed at the second side plates, in which the idle shaft is installed within the sloped holes;

control members installed to the second side plates at the lower end sides of the sloped holes; and adjusting bolts spirally connected to the control members and contacted by the outer surfaces of the idle shafts.

\* \* \* \* \*